(12) United States Patent
Lambourne et al.

(10) Patent No.: US 9,075,509 B2
(45) Date of Patent: Jul. 7, 2015

(54) USER INTERFACE TO PROVIDE ADDITIONAL INFORMATION ON A SELECTED ITEM IN A LIST

(75) Inventors: Robert A. Lambourne, Santa Barbara, CA (US); Andrew J. Schulert, Cambridge, MA (US); Steve Holmgren, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 1016 days.

(21) Appl. No.: 11/419,136

(22) Filed: May 18, 2006

(65) Prior Publication Data

US 2013/0254695 A1 Sep. 26, 2013

(51) Int. Cl.
  *G06F 3/048* (2013.01)
  *G06F 3/0484* (2013.01)
  *G06F 3/0482* (2013.01)
  *G11B 27/34* (2006.01)

(52) U.S. Cl.
  CPC ............ *G06F 3/0484* (2013.01); *G06F 3/0482* (2013.01); *G11B 27/34* (2013.01)

(58) Field of Classification Search
  CPC .................. G06F 3/0485; G06F 3/0488
  USPC .......... 715/830, 817, 819, 820, 856, 969, 825
  See application file for complete search history.

(56) References Cited

U.S. PATENT DOCUMENTS

| | | | |
|---|---|---|---|
| 6,690,391 B1* | 2/2004 | Proehl et al. | 715/720 |
| 2002/0089529 A1* | 7/2002 | Robbin | 345/716 |
| 2004/0175159 A1* | 9/2004 | Oetzel et al. | 386/125 |
| 2006/0008256 A1* | 1/2006 | Khedouri et al. | 386/124 |
| 2006/0026521 A1* | 2/2006 | Hotelling et al. | 715/702 |
| 2006/0045462 A1* | 3/2006 | Poslinski | 386/46 |
| 2006/0136383 A1* | 6/2006 | Golla | 707/3 |
| 2006/0195480 A1* | 8/2006 | Spiegelman et al. | 707/104.1 |
| 2006/0225097 A1* | 10/2006 | Lawrence-Apfelbaum | 725/61 |
| 2007/0124680 A1* | 5/2007 | Robbin et al. | 715/727 |
| 2007/0136750 A1* | 6/2007 | Abanami et al. | 725/44 |
| 2007/0150830 A1* | 6/2007 | Ording et al. | 715/784 |

OTHER PUBLICATIONS

Microsoft Outlook 2003, Microsoft Corporation, published in 2003, Microsoft outlook 2003_Screen shot; http://opan.admin.ufl.edu/user_guides/outlook2003_files/image045.jpg.*

Herrera et al., Simac: Semantic Interaction with Music Audio Contents; © 2005; IEEE; p. 399-406.*

* cited by examiner

*Primary Examiner* — Linh K Pham
(74) *Attorney, Agent, or Firm* — Hanley, Flight and Zimmerman, LLC

(57) ABSTRACT

Techniques pertaining to efficient scrolling a list are disclosed. One of the features of the efficient scrolling is to provide a graphic user interface that displays items in the list so that a user may scroll the list using a scroll wheel. After an item is highlighted for a predefined time, an information panel is automatically displayed to show hidden information associated with the item. The information panel is superimposed in an area of the graphic user interface, without obstructing the highlighted item.

25 Claims, 10 Drawing Sheets

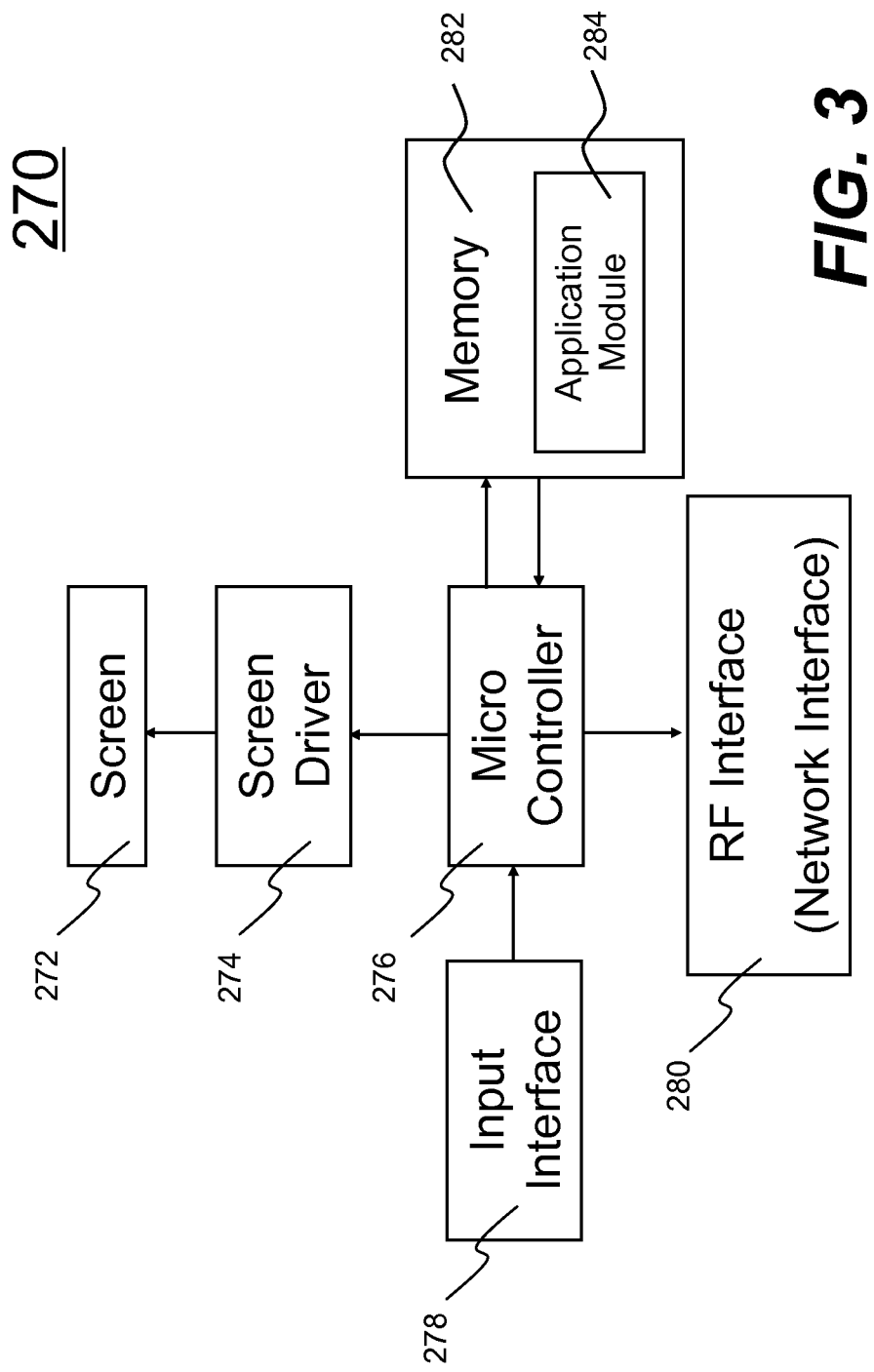

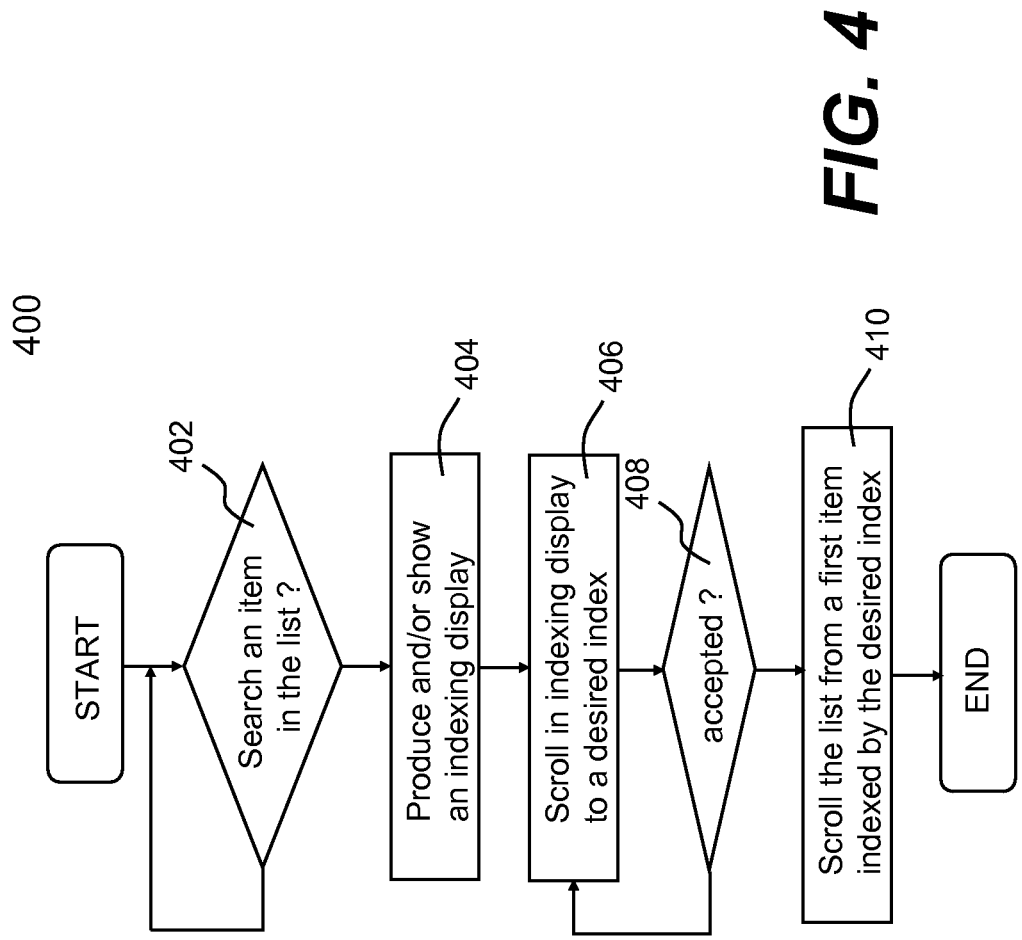

USER INTERFACE TO PROVIDE ADDITIONAL INFORMATION ON A SELECTED ITEM IN A LIST

BACKGROUND OF THE INVENTION

1. Field of the Invention

The invention is generally related to the area of man machine interface. In particular, the invention is related to method and apparatus for providing additional or hidden information on a selected item in a list of items.

2. The Background of Related Art

The most popular use of a scroll wheel may be probably found on an Apple's iPod. A scroll wheel of an iPod allows a user to scroll where he/she desires. Thus a user can choose songs to play on from lists of artists, albums, composers, genres, or tracks.

The underlying mechanism of a scroll wheel is a software module being executed to convert a physical motion of the user moving his/her finger over the scroll wheel to a highlight bar on a list of music items. The software module is configured based on the concept of 'acceleration'. In simple terms, this means that the faster the user turns the scroll wheel, the faster the list on the screen will scroll. This is very effective in allowing users to traverse long lists.

There are, however, at least two problems observed. First, it still takes a long time to get through a large list of music items. For example, if a desired item is an item No. 1500 in a list of 2000 songs, a user has to go through the first 1499 items before reaching the item No. 1500. Second, when a list is scrolled fast, it is very hard for the user to stop at the desired position without overshooting. For example. If the list is showing an artist named "Abba", and the user wants to scroll to an artist named "Sting", he/she must turn the scroll wheel fast in order to get from Abba to S's quickly. But because the list is long and so being scrolled fast, it is very easy to overshoot the list and get to the T's or U's by moving his/her finger on the scroll wheel too fast.

Once reaching a neighborhood of a desired item in a list, a user typically scrolls slowly through neighboring items before reaching the desired item. Depending on what is being searched, it is always preferable for the user to see what is being scrolled by in a substantially similar category. Sometimes, the desired item may not be in the list while there are others that are substantially similar to the desired item and may interest the user. FIG. 1A shows an example 150 of a music library called "albums" 152 including a list of albums. The contents 154 in the library 150 are shown as a list of items, each of the items is an album that may further include a list of tracks. As the user scrolls through the library 150, there is limited information about each of the albums except for a name thereof. It would be helpful if additional information is displayed without actually going into a specific album.

Thus, there is a need for solutions that can provide additional or hidden information on an item being selected, wherein a selection of an item means a stay of scrolling on the item for a predefined time.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to scrolling a list including many items that may be sorted or unsorted. According to one aspect of the present invention, a graphic user interface is provided to display the items in the list so that a user may scroll the list. After an item is highlighted for a predefined time, an information panel is automatically displayed to show hidden information associated with the item. According to another aspect of the present invention, the information panel is superimposed in an area of the graphic user interface, without obstructing the highlighted item.

According to still another aspect of the present invention, an indexing display is provided to facilitate a search of a desired item in the list. The indexing display provides a mechanism that can avoid going through a long list and wandering back and forth around the desired item. The indexing display includes a list of indexes, each corresponding to a group of items sharing one or more common characteristics (e.g., a character or a kind). The indexing display is allowed first to be scrolled for the desired index. Once the desired index is confirmed, searching for the desired item in the list starts at an item indexed by the desired index that also indexes the desired item.

The present invention may be implemented in many forms including software, hardware or a combination of both as a method and apparatus. According to one embodiment, the present invention is a method for scrolling a list of items, the method comprises providing a graphic user interface displaying the items in the list; and showing an information panel after an item in the list is highlighted for a predefined time, the information panel showing hidden information associated with the item, wherein the information panel is superimposed in an area of the graphic user interface. Depending on application, the method may be implemented as a software module loaded in a computer readable medium in a device (e.g., a portable device with a display screen). When executed, the software module causes the display to perform functions contemplated in the present invention.

According to another embodiment, the present invention is an apparatus for displaying a list of items, the apparatus comprises: a display screen, a screen driver configured to display the list on the display screen, a memory for storing code, a processor executing the code to perform operations of: providing a graphic user interface displaying the items in the list, and showing an information panel after an item in the list is highlighted for a predefined time, the information panel showing hidden information associated with the item, wherein the information panel is superimposed in the graphic user interface.

One of the objects, features, and advantages of the present invention is to provide solutions of effectively scrolling through a list of items.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3 illustrates an internal functional block diagram of an exemplary portable device;

FIG. 4 shows a flowchart of scrolling a list of items in accordance with one embodiment of the present invention;

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1A:
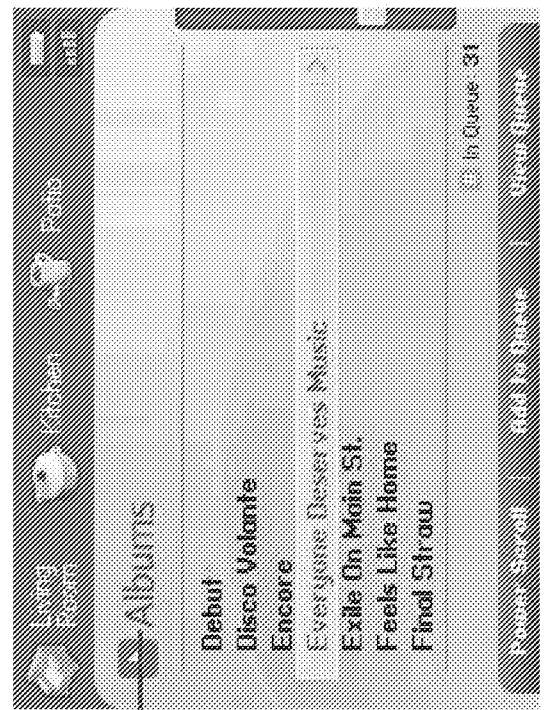
FIG. 1A shows an example of a music library called "albums" including a list of albums.
Figure 1B:
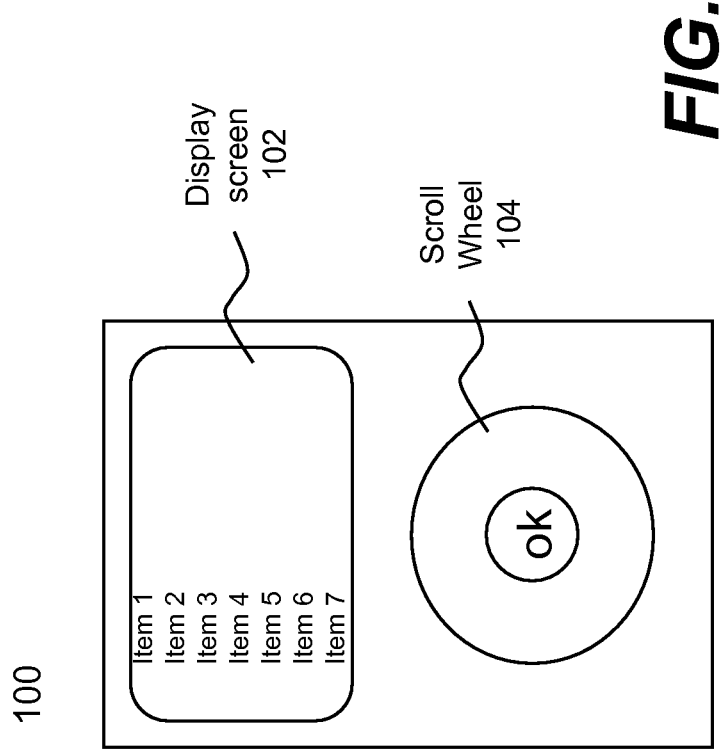
FIG. 1B shows an exemplary configuration in which the present invention may be practiced.

Referring now to the drawings, in which like numerals refer to like parts throughout the several views. FIG. 1B shows a front view of an Apple iPod 100 that includes a display screen 102 and a scroll wheel 104. A user may put a finger on the scroll wheel 104 to navigate a list being displayed in the screen 102 by moving the finger clockwise or counterclockwise. An acceleration of the finger movement would control a navigating speed of the list. Because the display screen 102 is relatively small, a search of an item down in the list would often overpass the item, resulting in repeated wandering back and forth around the item.

Figure 2A:
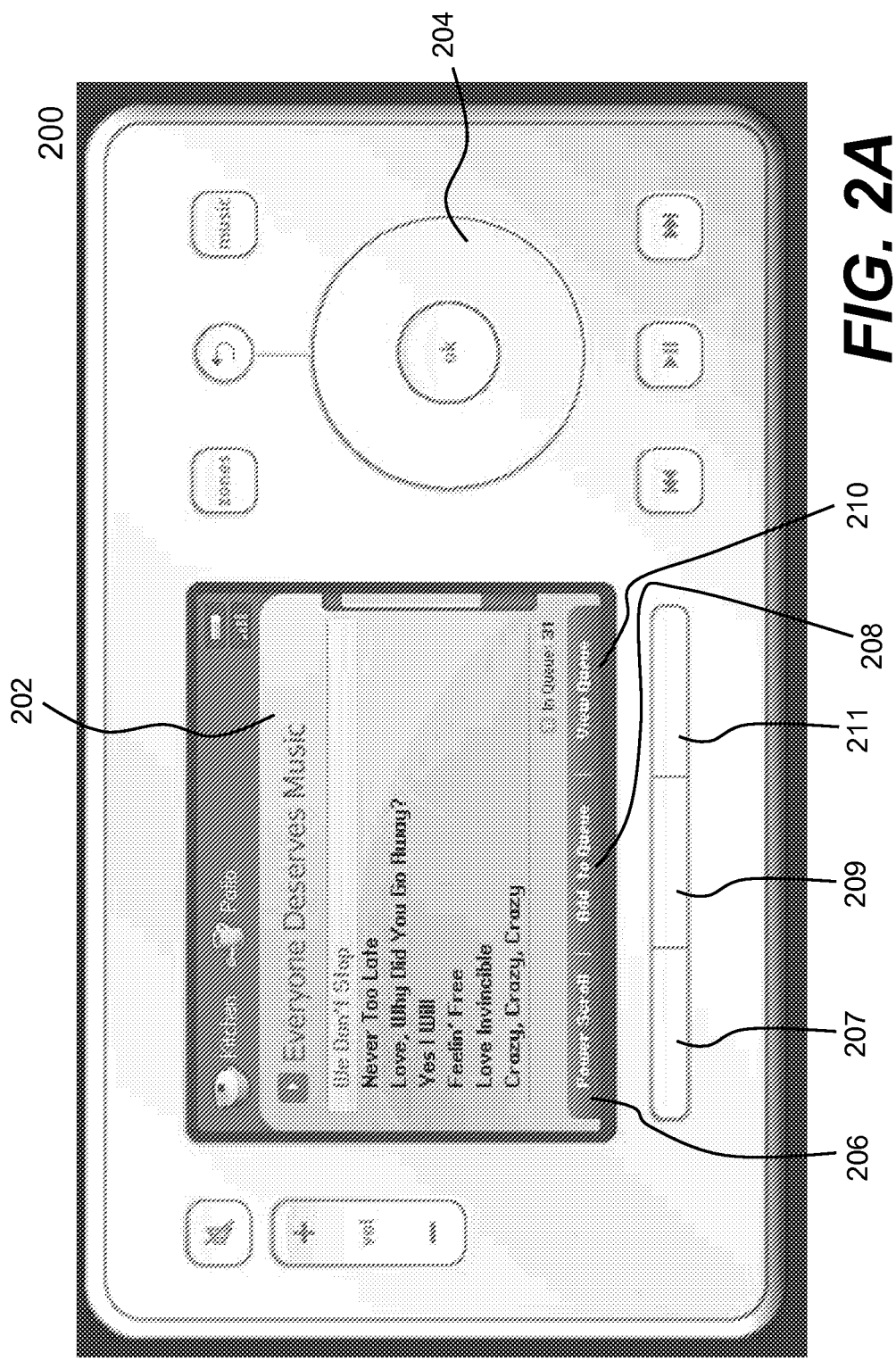
FIG. 2A shows an exemplary device in which the present invention is implemented according to one embodiment of the present invention.

FIG. 2A shows an exemplary device 200 in which the present invention is implemented according to one embodiment of the present invention. The device 200 includes a display screen 202 and a scroll wheel 204. Different from the device shown in FIG. 1, the display screen 202 includes a number of soft keys 206, 208, and 210 that can be respectively activated by buttons 207, 209, and 211. One of the soft keys 206 is labeled as "power scroll" that can be activated to start what is referred to herein as power scrolling. The soft key 206 may be activated by other means (e.g., touch screen). One of the features of the power scrolling is the underlying mechanism that provides a narrowed searching range from which a desired item may be readily located in a large list of items that may be provided locally or remotely.

Figure 2B:
FIG. 2B shows that, after the power scroll key is activated, a display, referred to herein as an indexing display, is popped up or displayed.

FIG. 2B shows that, after the power scroll key 206 is activated, a display 220, referred to herein as an indexing display, is popped up or displayed. As used herein, it is defined that a display screen or a screen is a physical display apparatus in a device, such as the display screen 202 of FIG. 2A, while a screen display or simply a display is an image presented on a display screen. According to one embodiment, the indexing display 220 is superimposed onto a displayed portion of a list of items. In another embodiment, the indexing display 220 is displayed on a side of a displayed portion of a list of items.

In any case, the indexing display 220 provides a list of indexes, each configured to cover a predefined range or a group of items sharing a common feature. As shown in the figure, the indexing display 220 shows a list of alphabets, each of the alphabets covers words or letters that begin with the corresponding alphabet. In operation, a user uses the scroll key 204 to scroll to a desired alphabet in the indexing display 220 that then leads to the beginning, middle or ending of a list of items that begin with the desired alphabet. As a result, a user does not have to scroll from the beginning of a list of items all the way to a desired item. With the power scrolling, the user now is able to "jump" to a right starting point and navigate in a much narrowed list for the desired item.

Figure 2C:
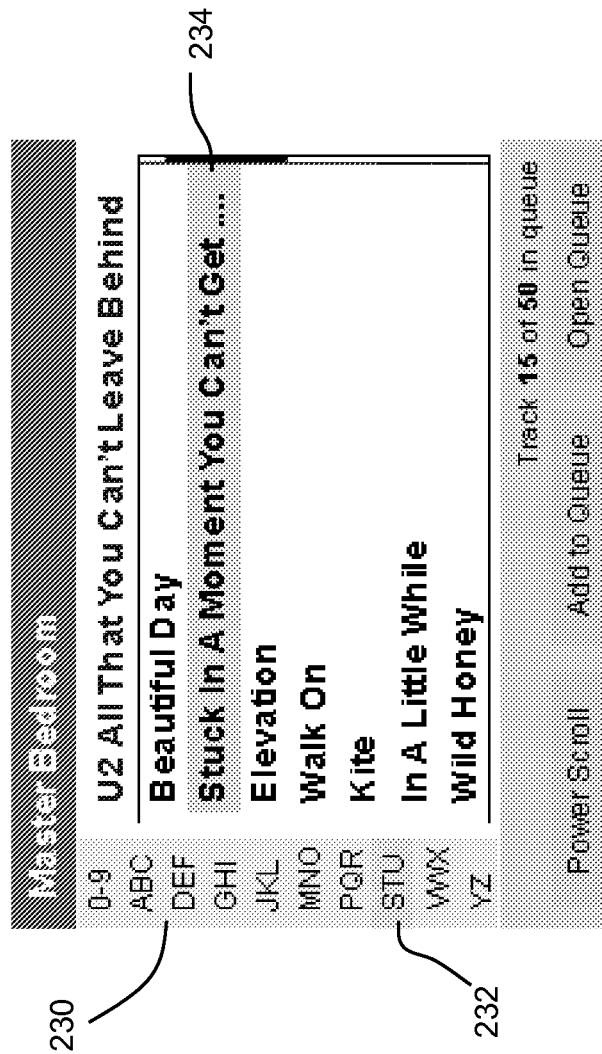
FIG. 2C shows another embodiment of the indexing display that shows a list of grouped indexes.

FIG. 2C shows another embodiment of the indexing display 230 that shows a list of grouped indexes. Instead of having one index for one type of items, one or more indexes are grouped as a grouped index such that all items in a list that begin with any index in one grouped index are associated with the grouped index. As shown in the figure, a grouped index "STU" 232 includes three characters and is selected, which leads to the beginning of items that are started with any of the characters "S", "T", and "U". As a result, a user does not have to go through items that begin with characters "A", "B", . . . or ""R", and jump right into the items beginning with the characters "S", "T", or "U". In one embodiment in which the list is not sorted, as shown in FIG. 2C, the next item that the highlight 234 moves to is an item starting with any of the characters "S", "T", and "U". In other words, the scrolling bar 234 is configured to move either linearly or nonlinearly in accordance with a selection in the indexing display.

FIG. 2B and FIG. 2C show two examples of indexing characters. It should be noted that an indexing display is not necessary to display only the first character of a word, a phrase or a string. Depending on application, an article, such as "a" or "the" may not be indexed at all, in which case, a next word may be used for indexing purpose. It can also be appreciated that the power scrolling may be used in other categories. For example, a list of items may be organized in terms of characteristics, each of the characteristics is indexed by a label, or one or more of the characteristics are indexed by a grouped label. When the power scrolling is on, a set of desired characteristics in a long list can be readily located by the indexing display, where the indexing display provides a list of labels or grouped labels for limited scrolling.

According to one embodiment, a list of songs is organized in terms of genre (e.g., classic, jazz, Latin, pop, Rock . . . ). Each category may contain numerous songs. Going through the list all the way to a particular song in Rock can be tedious and experience the overshooting. With the power scrolling, the indexing display shows a list of the genre and provides means for jumping right into a desired category from which a desired song is readily located.

According to one embodiment, after an index is selected, an item highlighted in a list can be either a first one or a last one in the category or group indexed by the selected index. When the first one is highlighted in a display screen, a last item of a preceding group is also displayed in the display screen. When the last one is highlighted in a display screen, a first item of a following group is also displayed in the display screen.

The power scrolling may be implemented in a device with a display screen. FIG. 3 illustrates an internal functional block diagram of an exemplary controller 270. The screen 272 on the controller 270 may be a LCD screen. The screen 272 communicates with and is commanded by a screen driver 274 that is controlled by a microcontroller (e.g., a processor) 276. The memory 282 may be loaded with one or more application modules 284 that can be executed by the microcontroller 276 with or without a user input via the user interface 278 to achieve desired tasks. In one embodiment, an application module contemplating the power scrolling and enabling one or more soft keys is loaded in the memory 282.

The controller 270 includes a network interface 280 referred to as a RF interface 280 that facilitates wireless communication with another device being controlled by the controller 270 via a corresponding wireless interface or RF interface thereof.

Referring now to FIG. 4, there shows a flowchart 400 of scrolling a list of items in accordance with one embodiment of the present invention. The flowchart 400 may be implemented in software, hardware or in a combination of both as a method, an apparatus or a part of a system. A list, typically containing many items, is displayed in a display screen. It can be appreciated to those skilled in the art that a list can be a collection of any items. To facilitate the understanding of the present invention, a list is considered a library of songs and each item is a song. The list is otherwise scrollable by a scroll wheel.

At 402, a user decides to look for an item in the list. Instead of starting scrolling the list, the user activates an indexing display that shows a list of indexes, each indexing a group of items that share one or more common features. In one example, the items in the group are all started with an identical character. In another example, the items in the group are started with one of limited number characters (e.g., three characters). In still another example, the items in the group belong to one category or kind.

In one embodiment, the list being displayed in an indexing display is pre-generated. If there is an index in the list that does not correspond to any item, an item that is closest to an item that would be otherwise indexed by the index is chosen. For example, an index "C" in the indexing display happens to be selected by a user while the underlying list does not have any items that are started with "C", in which case, either a last item in a group started with "B" or a first item in a group started with "D" is chosen. In another embodiment, the list being displayed in an indexing display is generated whenever this is an updated to the list of all items. At 406, the scroll wheel is associated with the indexing display such that the scrolling function now only applies to the indexing display. The user can quickly locate a desired index in the indexing display because the list in the indexing display is often short. At 408, if the located index is not the desired one, the process 400 goes back to 406 to allow the user continue looking for the desired one.

It is assumed that the located index is the desired one, the process 400 now goes to 410 where the scroll wheel is now associated with the list of all items. But the desired index brings a starting point right onto a very first item that is indexed by the desired index. From the starting point, the user can scroll the wheel to locate a desired item.

Figure 5A:
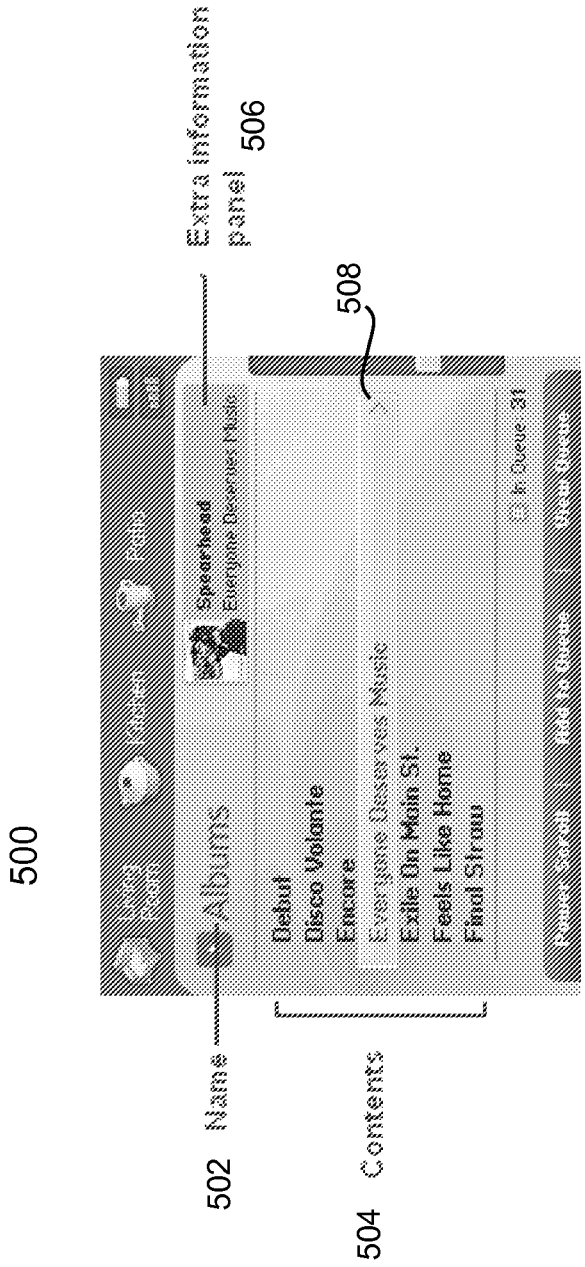
FIG. 5A shows an exemplary graphic user interface according to one embodiment of the present invention.

Referring now to FIG. 5A, there shows an exemplary graphic user interface 500 according to one embodiment of the present invention. The exemplary graphic user interface 500 is provided when a user desires to search an interested item in a list 504 or simply browse through the list. According to one embodiment, a library of multimedia items 504 (e.g., sound tracks or albums) called "albums" 502 is displayed. The number of the items may 504 exceed the display range of a display screen and thus become scrollable from one page to another. These items 504 may be provided locally or remotely. According to another embodiment in reference to FIG. 2B or 2C, the graphic user interface 500 is provided after a user selected an index in an indexing display.

Different from the prior art user interfaces, an information panel 506 is displayed when the user scrolls onto an item in the list 504 and stays thereon or highlights it for a predefined time (e.g., one second). Depending on implementation, the information panel 506 may be displayed anywhere without obstructing the highlighted item in the graphic user interface 500. As shown in FIG. 5A, the information panel 506 is displayed next to the name 502 of the list and shows a picture (album art), an album name and an associated artist thereof.

The specific location of the information panel 506 and the contents in the information panel 506 as shown in FIG. 5A shall not be considered as a limitation of the present invention. It can be appreciated by those skilled in the art that there are other ways to place the information panel 506 in the graphic user interface 500 and other information may be displayed in the information panel 506 when a corresponding item is highlighted. One of the important features in the present invention is to display additional or hidden information in a highlighted item. The hidden information is typically represented in metadata associated with the highlighted item. Depending on an exact application, the metadata associated with an item may be available locally or remotely.

In operation, when a list is being scrolled via a highlighting bar or a highlighting indicator, an information panel is superimposed in an area in a graphic user interface after an item is highlighted for a predefined time. This configurable delay provides at least two features. First, the delay allows a retrieval of the metadata of the highlighted item should a data source represented by the highlighted item happens to be remotely located (e.g., a song in another device across a network). Second, the delay avoids visual noise that shall be avoided when a user scrolls the list quickly. When the user scrolls through some other uninterested items at a certain speed, it is preferably required that the information panel is not shown or flashed by, which is achieved by the delay.

According to one embodiment, the information panel is configured to display the hidden information that may exceed a predefined display range of the information. Without obstructing the highlighted item, the information panel is automatically expanded to display the hidden information. In one embodiment as shown in FIG. 5A in which the information panel 506 is displayed next to the list name 502. The information panel 506 would be expanded to cover or obstruct the list name 502 in order to display the hidden information that exceeds the originally configured display size of the information panel 506.

In one embodiment, whenever an information panel obstructs something, the information panel is configured to disappear automatically after a predefined time (e.g., 5 seconds) so that the user can see what has been obstructed. What is important here is that the information panel is automatically displayed after an item in a list is highlighted for sometime and disappeared after sometime, without any action from the user, to avoid obscuring the user to continue browsing the list.

Figure 5B:
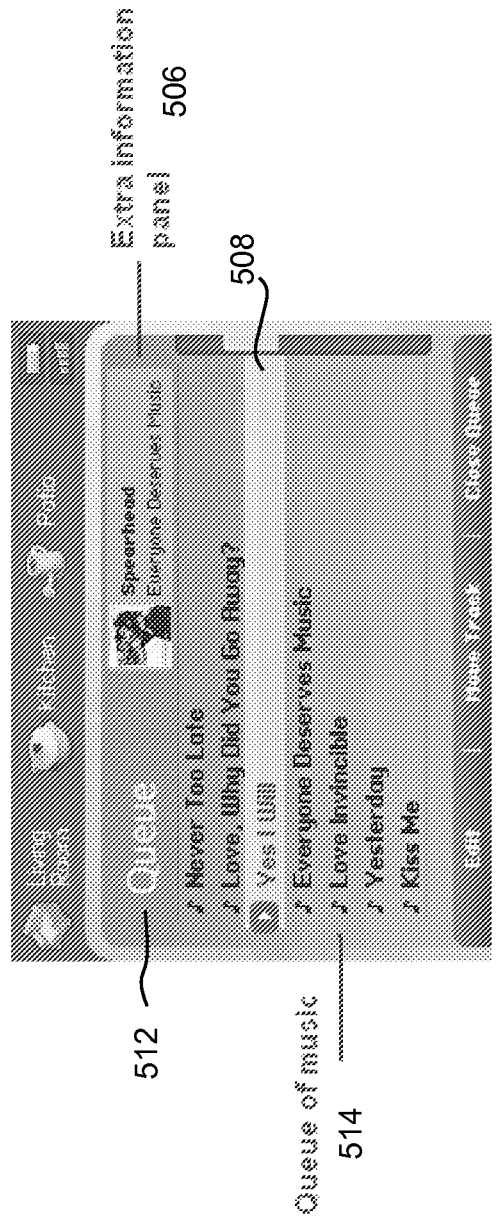
FIG. 5B shows a particular example in which a list named "Queue" includes a plurality of sound tracks.

FIG. 5B shows a list 512 named "Queue" that includes a plurality of sound tracks 514. As the user scrolls the tracks 514, one track 516 is highlighted by a scrolling bar for a predefined time, the information panel 506 is automatically activated to show the associated album art, the album name and the artist name so that the user sees more information about the highlighted item 516. The graphic user interface of FIG. 5B may be reached after the user selects the highlighted item 508 in FIG. 5A.

The examples in FIG. 5A or FIG. 5B pertain to songs, in which the information panel 506 shows a stationary picture. Those skilled in the art can appreciate that the information panel 506 can also be configured to display motion pictures. In certain applications, the metadata associated with an item pertains to a video clip. When the item is highlighted, the hidden video clip is played back to give the user a preview of the highlighted item. Depending on the nature of the item, the video clip may be a preview or a promotion. According to another embodiment, the information panel 506 is displayed to activate a preview of a song, for example, a sample of 15 seconds from the song. According to still another embodiment, the information panel 506 is displayed when the corresponding item is highlighted, in which case the information panel 506 is used to receive an input from the user (e.g., providing a rating on the item if desired).

Figure 6:
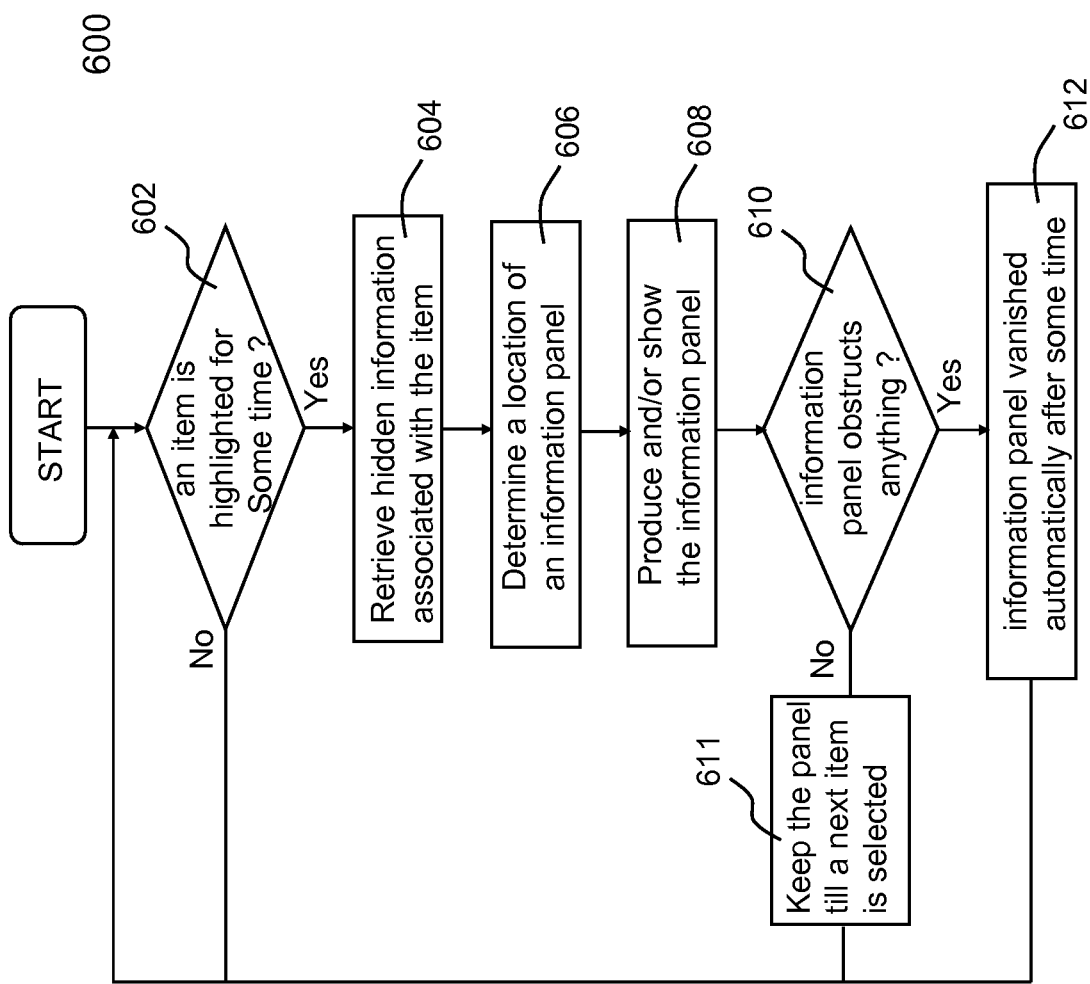
FIG. 6 shows a flowchart of providing an information panel after an item is highlighted, in accordance with one embodiment of the present invention.

Referring now to FIG. 6, there shows a flowchart or process 600 of providing an information panel in scrolling a list of items in accordance with one embodiment of the present invention. The process 600 may be implemented in software, hardware or in a combination of both as a method, an apparatus or a part of a system. In one embodiment, the process 600 is implemented as a software module that can be loaded in the memory 282 of FIG. 3 or as part of the application module 284.

A list, typically containing many items, is displayed in a display screen. It can be appreciated to those skilled in the art that a list can be a collection of any items. To facilitate the understanding of the present invention, a list is considered a library of songs and each item is a song. The list is otherwise scrollable by a scroll wheel.

At 602, the process 600 determines whether an item in the list is being highlighted for sometime (e.g., 1 second). If the item is just scrolled by, the process 600 is not activated. When it is determined that the item is highlighted or indicated by any means exceeding a predefined time, the process 600 goes to 604 where hidden information provided by the item is retrieved. Depending on the item, hidden information may be structured in different layers. In operation, the next layer of information is retrieved. Sometimes the hidden information is represented in metadata associated with the item. The metadata may be available locally or remotely. If the metadata is not available locally, a device practicing the process 600 is configured to request the metadata from another device that is remotely coupled to a network.

After the hidden information is retrieved, at 606, an information panel is constructed and determined to be displayed in an appropriate location of a graphic user interface. The location may be prefixed or dynamically determined. In any case, the location of the information panel is not to obstruct the item. At 608, the information panel is automatically displayed at the configured location associating with the item being highlighted.

Depending on the hidden information being displayed in the information panel, the size of the information panel may be expanded to accommodate the hidden information that may have to be extended in order to be comprehensible. At 610, if it is determined that the information panel is not obstructing anything in the graphic user interface, the information panel stays on and waits for a next item being scrolled on for sometime. If it is determined that the information panel is obstructing something in the graphic user interface, the process 600 goes to 612 where the information panel is automatically turned off to release the obstructed information so as to avoid obscuring a user to continue browsing the list. In one embodiment, the information panel may be configured to appear and disappear alternatively for sometime (e.g., 2 seconds each) provided the user is not scrolling onto another item.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A method for providing an information panel, the method comprising:

displaying a plurality of multimedia items in a list on a graphical user interface of a controller, the controller used to control an audio device;

displaying a movable indicator positioned with respect to a particular multimedia item of the plurality of multimedia items in response to receipt of input from the graphical user interface;

determining that the movable indicator has remained positioned with respect to the particular multimedia item for a first predefined time;

retrieving automatically, from a remote device and based on the moveable indicator position with respect to the particular multimedia item and upon passage of the first predefined time, additional information corresponding to the particular multimedia item, the additional information to form an information panel for the particular multimedia item, the additional information not shown in the list and instead displayed in the information panel; and displaying the information panel associated with the particular multimedia item via the controller, the information panel positioned over a portion of the graphical user interface, the information panel to display the additional information regarding the particular multimedia item, the additional information not otherwise viewable in the list of multimedia items, wherein the first predefined time is to avoid an inadvertent display of the information panel when the movable indicator is moving through the list;

determining whether the information panel is obstructing another item displayed via the graphical user interface;

when the information panel is determined to be obstructing another item displayed via the graphical user interface, triggering the information panel to automatically disappear after a second predefined time; and when the information panel is determined not to be obstructing another item displayed via the graphical user interface, displaying the information panel until a second multimedia item is selected.

2. The method as recited in claim 1, wherein the additional information is represented as metadata associated with the particular multimedia item.

3. The method as recited in claim 1, wherein the information panel is to be displayed without obstructing the particular multimedia item.

4. The method as recited in claim 1, wherein the first predefined time allows a retrieval of information for the information panel remotely across a network.

5. The method as recited in claim 1, wherein the information panel is to automatically expand to show the additional information should the additional information exceed a preconfigured display size of the information panel.

6. The method as recited in claim 5, wherein the information panel is to obstruct anything else but the particular multimedia item to display the additional information.

7. The method of claim 1, wherein the first predefined time equals the second predefined time.

8. The method as recited in claim 1, wherein each of the items is related to a group of songs or a sound track, and wherein information displayed in the information panel includes a picture representing an art associated with the group of songs or the sound track.

9. The method as recited in claim 1, further comprising:
showing an indexing display that includes a list of indexes, each corresponding to a group of items in the list that share one or more common characteristics;
facilitating user scrolling in the indexing display for a desired index; and
facilitating user scrolling in the list when the desired index is confirmed, wherein the scrolling in the list starts at the item indexed by the desired index.

10. The method as recited in claim 1, wherein the information panel is superimposed in an area of the graphical user interface apart from the list of items.

11. The method as recited in claim 1, wherein the particular multimedia item is not currently being played by the audio device.

12. The method as recited in claim 1, wherein retrieving automatically further comprises:
attempting to locate the additional information corresponding to the particular multimedia item locally on the controller; and,
upon a failure to locate the additional information locally, retrieving, from the remote device, the additional information.

13. A controller apparatus comprising:
a display to display a plurality of multimedia items in a list, the plurality of multimedia items selectable for play on a networked device;
an input interface to accept user touch input to position a moveable indicator with respect to a particular multimedia item of the plurality of multimedia items; and
a processor configured to:
determine that the moveable indicator has remained positioned with respect to the particular multimedia item for a first predefined time;
retrieve automatically, from a remote device and based on the moveable indicator position with respect to the particular multimedia item and upon passage of the first predefined time, additional information corresponding to the particular multimedia item, the additional information to form an information panel for the particular multimedia item, the additional information not shown in the list and instead displayed in the information panel;
display the information panel associated with the particular multimedia item via the controller, the information panel positioned over a portion of the graphical user interface, the information panel to display the additional information regarding the particular multimedia item, the additional information not otherwise viewable in the list of multimedia items, wherein the first predefined time is to avoid an inadvertent display of the information panel when the movable indicator is moving through the list;
determine whether the information panel is obstructing another item displayed via the graphical user interface;
when the information panel is determined to be obstructing another item displayed via the graphical user interface, trigger the information panel to automatically disappear after a second predefined time; and
when the information panel is determined not to be obstructing another item displayed via the graphical user interface, display the information panel until a second multimedia item is selected.

14. The apparatus as recited in claim 13, wherein the first predefined time is to allow a retrieval of information for the information panel remotely across a network.

15. The apparatus as recited in claim 13, wherein the processor is to attempt to locate the additional information corresponding to the particular multimedia item on the controller apparatus, and, upon a failure to locate the additional information locally, retrieve, from the remote device, the additional information.

16. The apparatus as recited in claim 13, wherein the additional information is represented as metadata associated with the particular multimedia item.

17. The apparatus as recited in claim 13, wherein the information panel is automatically displayed without obstructing the particular multimedia item.

18. The apparatus as recited in claim 13, wherein the additional information comprises a video clip or audio sample that is to be played when the moveable indicator has remained positioned with respect to the particular multimedia item for the first predefined time.

19. The apparatus as recited in claim 13, wherein the information panel is to expand to show the additional information should the additional information exceed a preconfigured display size of the information panel.

20. The apparatus as recited in claim 19, wherein the information panel is to obstruct anything else but the particular multimedia item to display the additional information.

21. The apparatus of claim 13, wherein the first predefined time equals the second predefined time.

22. The apparatus as recited in claim 13, wherein each of the items is related to a group of songs or a sound track, information displayed in the information panel is to include a picture representing an art associated with the group of songs or the sound track.

23. The apparatus as recited in claim 13, wherein the information panel is superimposed in an area of the display apart from the list of items.

24. The apparatus as recited in claim 13, wherein the particular multimedia item is not currently being played by the networked device.

25. The apparatus as recited in claim 13, wherein the processor is to further execute instructions to:
show an indexing display that includes a list of indexes, each corresponding to a group of items in the list that share one or more common characteristics;
facilitate user scrolling in the indexing display for a desired index; and facilitate user scrolling in the list when the desired index is confirmed, wherein the scrolling in the list starts at the item indexed by the desired index.

\* \* \* \* \*